United States Patent
Kokubu et al.

(10) Patent No.: US 11,742,480 B2
(45) Date of Patent: Aug. 29, 2023

(54) POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

(71) Applicant: Panasonic Intellectual Property Management Co., Ltd., Osaka (JP)

(72) Inventors: Takao Kokubu, Osaka (JP); Tomoki Tsuji, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 538 days.

(21) Appl. No.: 16/763,700

(22) PCT Filed: Oct. 19, 2018

(86) PCT No.: PCT/JP2018/038914
§ 371 (c)(1),
(2) Date: May 13, 2020

(87) PCT Pub. No.: WO2019/097951
PCT Pub. Date: May 23, 2019

(65) Prior Publication Data
US 2020/0373574 A1  Nov. 26, 2020

(30) Foreign Application Priority Data
Nov. 17, 2017 (JP) .................................. 2017-222199

(51) Int. Cl.
*H01M 4/525* (2010.01)
*H01M 4/505* (2010.01)
(Continued)

(52) U.S. Cl.
CPC ............ *H01M 4/525* (2013.01); *H01M 4/505* (2013.01); *H01M 4/623* (2013.01); *H01M 4/625* (2013.01);
(Continued)

(58) Field of Classification Search
CPC ........... H01M 10/052; H01M 10/0525; H01M 10/0567; H01M 10/0569;
(Continued)

(56) References Cited

U.S. PATENT DOCUMENTS 6,190,803 B1 * 2/2001 Tomiyama ............ H01M 4/661
429/231.95
2008/0213670 A1  9/2008 Okada et al.
(Continued)

FOREIGN PATENT DOCUMENTS

JP         09129230 A  *  5/1997
JP         H09-129230 A    5/1997
(Continued)

OTHER PUBLICATIONS

The Extended (Supplementary) European Search Report dated Dec. 15, 2020, issued in counterpart EP Application No. 18877343.6. (8 pages).
(Continued)

*Primary Examiner* — Carlos Barcena
(74) *Attorney, Agent, or Firm* — WHDA, LLP

(57) ABSTRACT

This positive electrode active material for nonaqueous electrolyte secondary batteries comprises composite oxide particles which contain Ni, Co and Li, while containing at least one of Mn and Al, and wherein the ratio of Ni to the total number of moles of the metal elements other than Li is 80% by mole or more. The composite oxide particles are composed of particles in an aggregated state and particles in a non-aggregated state; and the content ratio of the particles in
(Continued)

an aggregated state to the particles in a non-aggregated state is from 5:95 to 50:50 in terms of the mass ratio.

8 Claims, 1 Drawing Sheet

(51) Int. Cl.
*H01M 4/62* (2006.01)
*H01M 10/0525* (2010.01)
*H01M 10/0567* (2010.01)
*H01M 10/0569* (2010.01)
*H01M 4/02* (2006.01)

(52) U.S. Cl.
CPC .......... *H01M 10/0525* (2013.01); *H01M 10/0567* (2013.01); *H01M 10/0569* (2013.01); *H01M 2004/028* (2013.01); *H01M 2300/0034* (2013.01)

(58) Field of Classification Search
CPC .......... H01M 2004/028; H01M 2300/0034; H01M 4/505; H01M 4/525; H01M 4/623; H01M 4/625; H01M 4/66
See application file for complete search history.

(56) References Cited

U.S. PATENT DOCUMENTS

| | | | |
|---|---|---|---|
| 2011/0104569 A1 | 5/2011 | Sugaya et al. | |
| 2012/0141869 A1* | 6/2012 | Takahata | H01M 10/44 429/188 |
| 2013/0330613 A1 | 12/2013 | Saruwatari et al. | |
| 2016/0036041 A1 | 2/2016 | Uwai et al. | |
| 2016/0158831 A1 | 6/2016 | Hartig | |
| 2016/0248090 A1 | 8/2016 | Maeda et al. | |

FOREIGN PATENT DOCUMENTS

| | | |
|---|---|---|
| JP | H11-219709 A | 8/1999 |
| JP | 2002-8717 A | 1/2002 |
| JP | 2003-68300 A | 3/2003 |
| JP | 2008-251527 A | 10/2008 |
| JP | 2009-32647 A | 2/2009 |
| JP | 2013-239307 A | 11/2013 |
| JP | 2016-157677 A | 9/2016 |
| KR | 20140081663 A | 7/2014 |
| WO | 2010/106768 A1 | 9/2010 |
| WO | 2012/111813 A1 | 8/2012 |
| WO | 2014/142279 A1 | 9/2014 |
| WO | 2015/011233 A1 | 1/2015 |
| WO | 2017/169129 A1 | 10/2017 |

OTHER PUBLICATIONS

Zuo, Daxian et al., "Recent progress in surface coating of cathode materials for lithium ion secondary batteries", Journal of Alloys and Compounds, Elsevier Sequoia, Lausanne, CH, vol. 706, Feb. 24, 2017, pp. 24-40, XP029950253; Cited in Extended European Search Report dated Dec. 15, 2020. (17 pages).

International Search Report dated Jan. 22, 2019, issued in counterpart application No. PCT/JP2018/038914. (4 pages).

* cited by examiner

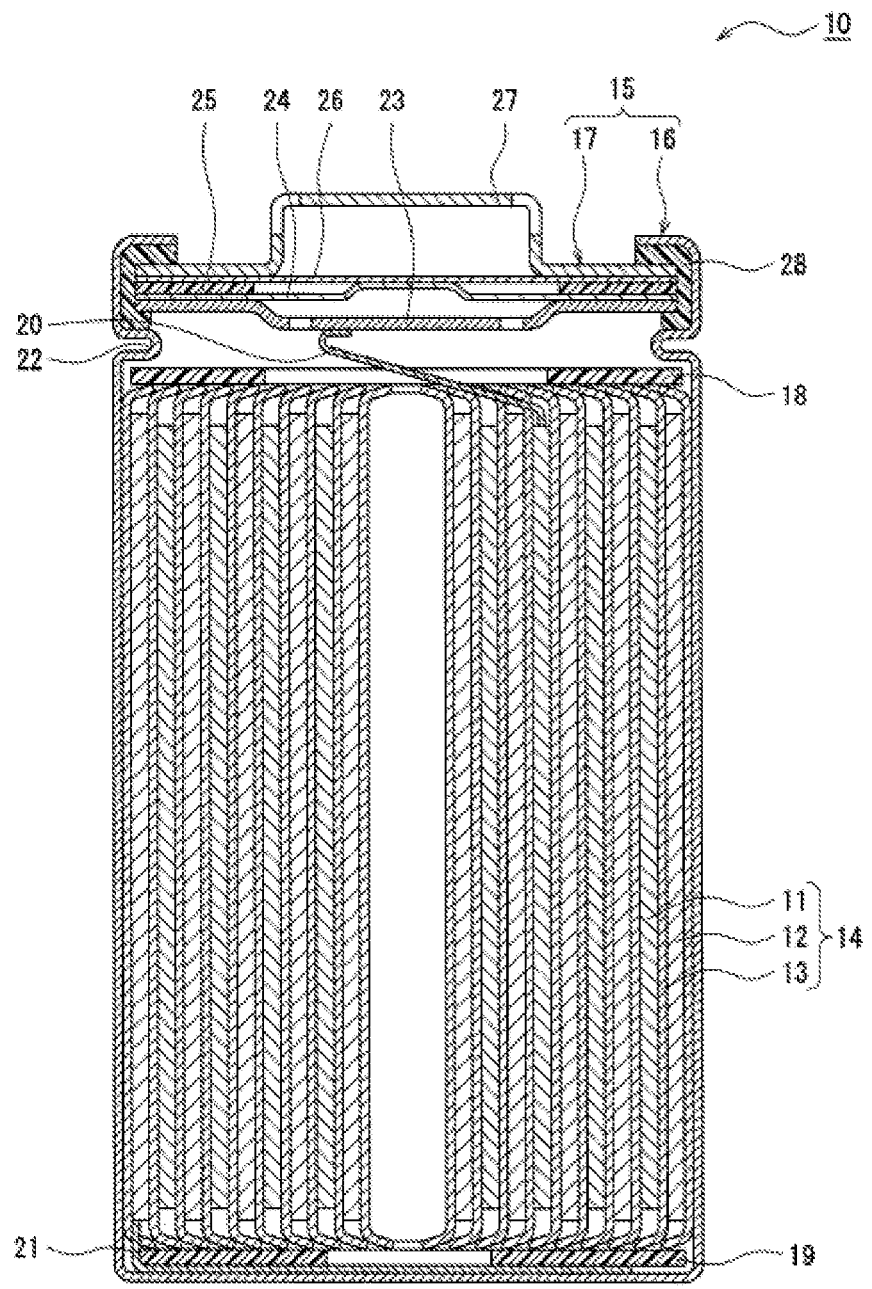

POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

TECHNICAL FIELD

The present invention relates to a technology for a positive electrode active material for a non-aqueous electrolyte secondary battery and a non-aqueous electrolyte secondary battery.

BACKGROUND ART

Recently, as high output and high energy density secondary batteries, non-aqueous electrolyte secondary batteries comprising a positive electrode, a negative electrode, and a non-aqueous electrolyte have been widely utilized. In the batteries, charging and discharging is conducted by migration of lithium ions between the positive electrode and the negative electrode.

For example, Patent Literature 1 discloses that a material composed of a powder of a lithium transition metal composite oxide, which powder is constituted by powder particles present substantially singly without forming aggregations, is used as a positive electrode active material to constitute a positive electrode. Patent Literature 1 mentions that a non-aqueous electrolyte secondary battery having satisfactory charge and discharge cycle characteristics can be provided by use of the above positive electrode active material.

CITATION LIST

Patent Literature

PATENT LITERATURE 1: Japanese Unexamined Patent Application Publication No. 2003-68300
PATENT LITERATURE 2: Japanese Unexamined Patent Application Publication No. 2009-32647

SUMMARY

In the case of composite oxide particles including Ni, Co, and Li, also including at least one of the group consisting of Mn and Al, and having a proportion of Ni of 80 mol % or more based on the total number of moles of the metal elements except for Li, if the composite oxide particles are particles in non-aggregated state as in Patent Literature 1, satisfactory charge and discharge cycle characteristics can be obtained, but a problem occurs in that the battery capacity (discharge capacity) is reduced. From the viewpoint of improvement in the output of the battery, reduction in the direct current resistance of the battery is desired, but it is difficult to reduce the direct current resistance of the battery even if the technique of Patent Literature 1 is applied thereto.

Thus, an object of the present disclosure to provide a positive electrode active material for a non-aqueous electrolyte secondary battery having composite oxide particles, the composite oxide particles including Ni, Co, and Li, also including at least one of the group consisting of Mn and Al, and having a proportion of Ni of 80 mol % or more based on the total number of moles of the metal elements except for Li, the positive electrode active material being capable of improving the battery capacity and reducing the direct current resistance of batteries in comparison with a positive electrode active material in which the composite oxide particles are particles in a non-aggregated state, and a non-aqueous electrolyte secondary battery having the positive electrode active material for a non-aqueous electrolyte secondary battery.

The positive electrode active material for a non-aqueous electrolyte secondary battery according to one aspect of the present disclosure has composite oxide particles including Ni, Co, and Li, also including at least one of the group consisting of Mn and Al, and having a proportion of Ni of 80 mol % or more based on the total number of moles of the metal elements except for Li. The composite oxide particles are composed of particles in an aggregated state and particles in a non-aggregated state, and the content ratio between the particles in an aggregated state and the particles in a non-aggregated state is in the range of 5:95 to 50:50 in terms of mass ratio.

The non-aqueous electrolyte secondary battery according to one aspect of the present disclosure comprises a positive electrode, a negative electrode, and a non-aqueous electrolyte, the positive electrode has a positive electrode current collector and a positive electrode active material layer, and the positive electrode active material layer includes the positive electrode active material for a non-aqueous electrolyte secondary battery described above.

According to the positive electrode active material for a non-aqueous electrolyte secondary battery according to one aspect of the present disclosure, the positive electrode active material has composite oxide particles including Ni, Co, and Li and also including at least one of the group consisting of Mn and Al. The positive electrode active material can improve the battery capacity and additionally reduce the direct current resistance of batteries, in comparison with a positive electrode active material in which composite oxide particles are particles in a non-aggregated state.

BRIEF DESCRIPTION OF DRAWING

FIG. 1 is a sectional view of a non-aqueous electrolyte secondary battery, which is one example of the embodiment.

DESCRIPTION OF EMBODIMENTS

The positive electrode active material for a non-aqueous electrolyte secondary battery according to one aspect of the present disclosure has composite oxide particles, the composite oxide particles including Ni, Co, and Li, also including at least one of the group consisting of Mn and Al, and having a proportion of Ni of 80 mol % or more based on the total number of moles of the metal elements except for Li. The composite oxide particles are composed of particles in an aggregated state and particles in a non-aggregated state, and the content ratio between the particles in an aggregated state and the particles in a non-aggregated state is in the range of 5:95 to 50:50 in terms of mass ratio. Here, the particles in a non-aggregated state include not only particles in a state where composite oxide particles are separated completely one primary particle by one primary particle but also particles in a state where several to ten and several (specifically 2 to 19) primary particles are assembled. The particles in an aggregated state refer to particles in a state where several tens of (specifically 20 or more) primary particles of the composite oxide particles are assembled.

Then, according to the positive electrode active material for a non-aqueous electrolyte secondary battery according to one aspect of the present disclosure, it is possible to improve the battery capacity (discharge capacity) and to reduce the direct current resistance. This mechanism is not sufficiently obvious, but the following is presumed.

In the case where the composite oxide particles including Ni, Co, and Li, also including at least one of the group consisting of Mn and Al, and having a proportion of Ni of 80 mol % or more based on the total number of moles of the metal elements except for Li are particles in a non-aggregated state, a phase change (change of the crystal structure and the like) in the last stage of discharging is unlikely to occur, in comparison with the case where the composite oxide particles are in an aggregated state. This phase change contributes to improvement in the battery capacity. Thus, in the case where the composite oxide particles are particles in a non-aggregated state, the battery capacity decreases (note that the charge and discharge cycle characteristics are improved as mentioned above) in comparison with the case where the composite oxide particles are particles in an aggregated state. Here, as in the positive electrode active material for a non-aqueous electrolyte secondary battery according to one aspect of the present disclosure, when the composite oxide particles are composed of particles in an aggregated state and particles in a non-aggregated state and the content ratio between the particles in an aggregated state and the particles in a non-aggregated state is 5:95 to 50:50 in terms of mass ratio, the particles in an aggregated state, which undergo a phase change in the last stage of discharging, have a depth of discharge deeper than that of the particles in a non-aggregated state, which are unlikely to undergo a phase change. It is presumed that the difference in the depth of discharge of the composite oxide particles in this electrode results in an electrochemical interaction between the particles in an aggregated state and the particles in a non-aggregated state to thereby make the phase change of the particles in a non-aggregated state likely to occur. Accordingly, the positive electrode active material for a non-aqueous electrolyte secondary battery according to one aspect of the present disclosure has an improved battery capacity in comparison with the positive electrode active material for a non-aqueous electrolyte secondary battery in which the composite oxide particles are particles in a non-aggregated state.

In the case where the composite oxide particles are composed of particles in an aggregated state and particles in a non-aggregated state, a difference in the depth of discharge occurs between the particles in an aggregated state and the particles in a non-aggregated state. Then, the presence of the particles having a shallower depth of discharge (particles in a non-aggregated state) contributes to reduction in the direct current resistance of the battery. Here, as in the positive electrode active material for a non-aqueous electrolyte secondary battery according to one aspect of the present disclosure, when the content ratio between the particles in an aggregated state and the particles in a non-aggregated state is in the range of 5:95 to 50:50 in terms of mass ratio, in comparison the case where the content ratio is out of the above range, a difference in the depth of discharge occurs between the particles in an aggregated state and the particles in a non-aggregated state. The ratio of the particles having the shallower depth of discharge (particles in a non-aggregated state) increases, and it is thus presumed that the direct current resistance of the battery is reduced.

Hereinafter, one example of the embodiment will be described in detail. The drawing referred to in the description of the embodiment is drawn schematically, and the dimensional ratio of the constituents drawn in the drawing may be different from that of the actual constituents.

FIG. 1 is a sectional view of a non-aqueous electrolyte secondary battery, which is one example of the embodiment. A non-aqueous electrolyte secondary battery 10 shown in FIG. 1 comprises a wound-type electrode assembly 14 in which a positive electrode 11 and a negative electrode 12 are wound via a separator 13, a non-aqueous electrolyte, insulating plates 18 and 19 each disposed above and under the electrode assembly 14, and a battery case 15 accommodating the members described above. The battery case 15 is composed of a bottomed cylindrical case body 16 and a sealing assembly 17 blocking the opening of the case body 16. Instead of the wound-type electrode assembly 14, an electrode assembly in a different form may be used, such as a layered electrode assembly in which a positive electrode and a negative electrode are alternately layered via a separator. Examples of the battery case 15 can include metal cases such as cylindrical, rectangular, coin-shaped, and button-shaped cases, and resin cases formed by laminating a resin sheet (laminate-type battery).

The case body 16 is, for example, a bottomed cylindrical metal container. A gasket 28 is provided between the case body 16 and the sealing assembly 17 to achieve hermeticity inside the battery. The case body 16 has a projecting portion 22 for supporting the sealing assembly 17, at which a portion of the side wall, for example, projects inside. The projecting portion 22 is preferably formed along the peripheral direction of the case body 16 in a circular shape to support the sealing assembly 17 by the upper surface thereof.

The sealing assembly 17 has a structure in which a filter 23, a lower vent member 24, an insulating member 25, an upper vent member 26, and a cap 27 are layered from the side of the electrode assembly 14. The members constituting the sealing assembly 17 each have, for example, a disk shape or a ring shape, and the members except for the insulating member 25 are each electrically connected to one another. The lower vent member 24 and the upper vent member 26 are connected at each center part to each other, and the insulating member 25 is interposed between the peripheral edges of the vent members. When the internal pressure of the non-aqueous electrolyte secondary battery 10 rises by heat generation due to an internal short circuit or the like, for example, the lower vent member 24 deforms and breaks so as to push up the upper vent member 26 toward the side of the cap 27, and the current path between the lower vent member 24 and the upper vent member 26 is disconnected. When the internal pressure further increases, the upper vent member 26 breaks, and gas is emitted from the opening of the cap 27.

In the non-aqueous electrolyte secondary battery 10 as shown in FIG. 1, a positive electrode lead 20 attached to the positive electrode 11 extends through a through-hole in the insulating plate 18 to the side of the sealing assembly 17, and a negative electrode lead 21 attached to the negative electrode 12 extends through outside the insulating plate 19 to the side of the bottom of the case body 16. The positive electrode lead 20 is connected to the lower surface of the filter 23, which is the bottom plate of the sealing assembly 17, by means of welding or the like. The cap 27, which is the top plate of the sealing assembly 17 electrically connected to the filter 23, serves as the positive electrode terminal. The negative electrode lead 21 is connected to the inner surface of the bottom of the case body 16 by means of welding or the like, and the case body 16 serves as the negative electrode terminal.

Hereinafter, the positive electrode, the negative electrode, the non-aqueous electrolyte, and the separator will be described in detail.

[Positive Electrode]

The positive electrode 11 is composed of, for example, a positive electrode current collector and a positive electrode active material layer formed on the positive electrode current collector. As the positive electrode current collector, it is possible to use foil of a metal stable in the potential range of the positive electrode, such as aluminum, a film including such a metal disposed on the surface layer thereof, or the like.

The positive electrode active material layer includes a positive electrode active material. The positive electrode active material layer preferably also includes a binder so that the positive electrode active material particles are bound to one another to thereby achieve the mechanical strength of the positive electrode active material layer, the binding property between the positive electrode active material layer and the positive electrode current collector can be improved, and the like. The positive electrode active material layer preferably also includes a conductive agent so that the conductivity of the layer can be improved and the like.

The positive electrode active material includes composite oxide particles including Ni, Co, and Li and also including at least one of the group consisting of Mn and Al, the composite oxide particles having a proportion of Ni of 80 mol % or more based on the total number of moles of the metal elements except for Li. Hereinafter, the composite oxide particles are referred to as high Ni-containing composite oxide particles.

The high Ni-containing composite oxide particles are preferably composite oxide particles represented by, for example, the general formula: $Li_xNi_{1-y-z}Co_yM_zO_2$, where $0.9 \leq x \leq 1.2$, $0 < y+z \leq 0.2$, and M includes at least one element of the group consisting of Al and Mn. The proportion of Ni in the high Ni-containing composite oxide particles is only required to be 80 mol % or more as described above. From the viewpoint that, for example, a non-aqueous electrolyte secondary battery can be allowed to have a higher capacity and the like, the proportion is preferably 80 mol % or more and 95 mol % or less (in the case of the above-described general formula, $0.05 \leq y+z \leq 0.2$ is preferable). The high Ni-containing composite oxide particles may also include other elements than Li, Ni, Co, Al, and Mn, and examples of the elements can include W, Si, B, Zr, Mg, P, Ti, Mo, Na, Sc, Y, Fe, Cu, Zn, Cr, Pb, Sb, and B (in the case of the above-described general formula, M may include at least one element of the group consisting of Al and Mn and other elements than Al and Mn (e.g., at least one element of the group consisting of W, Si, B, Zr, Mg, P, Ti, Mo, Na, Sc, Y, Fe, Cu, Zn, Cr, and Pb)).

The high Ni-containing composite oxide particles are composed of particles in a non-aggregated state and particles in an aggregated state. That is, in the positive electrode active material layer, the high Ni-containing composite oxide particles are composed of high Ni-containing composite oxide particles in a state where the primary particles are separated completely one by one (particles in a state where several to ten and several primary particles are assembled are also included) and high Ni-containing composite oxide particles in a state where several tens or more of primary particles are assembled. Discrimination between the particles in an aggregated state and the particles in a non-aggregated state (quantification of the assembly state of primary particles) is conducted by the following method. For example, the positive electrode 11 is embedded into a resin, and a cross section of the positive electrode 11 is prepared by cross section polisher (CP) processing or the like. The cross section of the positive electrode active material layer in this cross section is imaged by a SEM. Alternatively, the powder of the high Ni-containing composite oxide particles is embedded into a resin, and a particle cross section of the high Ni-containing composite oxide particles is prepared by cross section polisher (CP) processing or the like. This cross section is imaged by a SEM. Then, particles of which particle diameter observed in the cross-sectional SEM image has an error within 10% from the volume average particle size are chosen, and the primary particle size thereof is identified. The primary particles and the particles in an aggregated state are each assumed to be a true sphere, and determination is made from the ratio of the volume of the primary particles to the volume assumed from the volume average particle size.

The content ratio between the particles in an aggregated state and the particles in a non-aggregated state in the high Ni-containing composite oxide particles is not particularly limited as long as being in the range of 5:95 to 50:50 in terms of mass ratio. In respect of improvement in the battery capacity, reduction in the direct current resistance of the battery, and the like, the content ratio is preferably in the range of 10:90 to 30:70. That is, the content ratio of the particles in an aggregated state is in the range of 5% by mass to 50% by mass, preferably in the range of 10% by mass to 30% by mass, and the content ratio of the particles in a non-aggregated state is in the range of 50% by mass to 95% by mass, preferably in the range of 70% by mass to 90% by mass, based on the total amount of the particles in an aggregated state and the particles in a non-aggregated state. The content ratio between the particles in an aggregated state and the particles in a non-aggregated state can be grasped from the amount of each type of particles added in the production stage of the positive electrode 11. Alternatively, for example, the content ratio also can be estimated by measuring the average size of the secondary particles in a non-aggregated state and the average size of the secondary particles in an aggregated state from the above cross-sectional SEM image and calculating each volume ratio.

The average particle size of the particles in a non-aggregated state is preferably, for example, in the range of 2 μm to 20 μm. In the case where the average particle size satisfies the above range, in comparison with the case where the above range is not satisfied, the packing density in the positive electrode active material layer may be enhanced and thus the battery capacity may be further improved. The average particle size of the particles in a non-aggregated state is the volume average particle size measured by a laser diffraction method, meaning a median diameter at which the cumulative volume value is 50% in the particle diameter distribution. The average particle size of the particles in a non-aggregated state can be measured by a laser diffraction method using, for example, MT3000II of MicrotracBEL Corp.

The compression strength of the particles in a non-aggregated state is, for example, preferably 250 MPa or more, more preferably 350 MPa or more. In the case where the compression strength of the particles in a non-aggregated state satisfies the above range, in comparison with the case where the above range is not satisfied, cracking of particles due to charge and discharge may be inhibited, and thus deterioration in the charge and discharge cycle characteristics may be inhibited. The upper limit of the compression strength of the particles in a non-aggregated state is not particularly limited, and is preferably, for example, 1500 MPa or less from the viewpoint of the performance of the materials. The compression strength is measured by the method defined by JIS-R1639-5.

The average particle size of the primary particles constituting the particles in an aggregated state is, for example, preferably 500 nm or less, more preferably in the range of 50 nm to 300 nm. In the case where the average particle size of the primary particles constituting the particles in an aggregated state is 50 nm or less, primary particle interfaces are excessive, and thus the average operational voltage decreases. In the case of the average particle size of 300 nm or more, the initial efficiency decreases, and thus a sufficient capacity cannot be obtained. Accordingly, in the case where the above range is satisfied, in comparison with the case where the above range is not satisfied, the battery power may be further improved. For the average particle size of the primary particles, 20 primary particles are randomly selected from the above cross-sectional SEM image. The grain boundaries of 10 particles of the selected primary particles are observed, and the contour of the primary particles is identified. Then, the major axis of each of 20 primary particles is determined, and the average value thereof is taken as the average particle size of the primary particles.

The average particle size of the particles in an aggregated state is preferably, for example, in the range of 5 μm to 20 μm. In the case where the average particle size of the particles in an aggregated state satisfies the above range, in comparison with the case where the particle size is out of the above range, the packing density in the positive electrode active material layer may be enhanced and thus the battery capacity may be further improved. The average particle size of the particles in an aggregated state is the volume average particle size measured by a laser diffraction method, meaning a median diameter at which the cumulative volume value is 50% in the particle diameter distribution. The average particle size of the particles in an aggregated state can be measured by a laser diffraction method using, for example, MT3000II of MicrotracBEL Corp.

With respect to particles in an aggregated state, one particle is preferably constituted by 10000 to 5000000 primary particles. When one particle in an aggregated state is constituted by 10000 to 5000000 primary particles, for example, micronization of the particles in an aggregated state may be inhibited and thus reduction in the charge and discharge cycle characteristics may be inhibited.

The content of the high Ni-containing composite oxide particles is, for example, preferably in the range of 50% by mass to 100% by mass, more preferably in the range of 80% by mass to 95% by mass based on the total amount of the positive electrode active material. In the case where the content of the high Ni-containing composite oxide particles is out of the above range, in comparison with the case where the above range is satisfied, the effect of improving the battery capacity may be reduced. The positive electrode active material may include other positive electrode active material particles than the high Ni-containing composite oxide particles, and example thereof include non Ni-containing composite oxide particles such as $LiCoO_2$ and $LiMn_2O_4$ and composite oxide particles in which the proportion of Ni is less than 80 mol % based on the total number of moles of the metal elements except for Li.

The content of the positive electrode active material is, for example, preferably 70% by mass or more and 99% by mass or less, more preferably 80% by mass or more and 95% by mass or less based on the total amount of the positive electrode active material layer.

One example of the method for producing the high Ni-containing composite oxide particles will be described.

The method for producing the high Ni-containing composite oxide particles include a composite hydroxide synthesizing step of obtaining a Ni—Co—Al composite hydroxide, a Ni—Co—Mn composite hydroxide, and the like, a raw material mixing step of mixing the composite hydroxides and a lithium compound to obtain a raw material mixture, and a firing step of firing the raw material mixture to obtain high Ni-containing composite oxide particles.

Examples of the composite hydroxide synthesizing step include a coprecipitation method in which a Ni—Co—Al composite hydroxide or a Ni—Co—Mn composite hydroxide is precipitated (coprecipitated) by adding an alkali solution such as sodium hydroxide dropwise while stirring a solution of metal salts including Ni, Co, Al (or Mn) and the like to adjust the pH to the alkali side (for example, 8.5 to 11.5), and the like.

Here, in the case where the high Ni-containing composite oxide particles are obtained as particles in a non-aggregated state, the composite hydroxide synthesizing step preferably includes an aging step in which, after a composite hydroxide is precipitated, the composite hydroxide is left as it is in the reaction solution. This makes high Ni-containing composite oxide particles to be finally obtained more likely to be obtained as particles in a non-aggregated state.

The raw material mixing step is a method for obtaining a raw material mixture by mixing, for example, the above composite hydroxide and a lithium compound such as lithium hydroxide, lithium carbonate, or lithium nitrate. Particles in a non-aggregated state or particles in an aggregated state can be prepared by adjusting the mixing ratio between the composite hydroxide and the lithium compound. For example, in the case where high Ni-containing composite oxide particles are obtained as particles in a non-aggregated state, the mixing ratio between the composite hydroxide and the lithium compound is preferably adjusted such that metal elements (Ni+Co+Al or Mn):Li is in the range of 1.0:1.02 to 1.0:1.2 in terms of the molar ratio. Alternatively, for example, in the case where high Ni-containing composite oxide particles are obtained as particles in an aggregated state, the mixing ratio between the composite hydroxide and the lithium compound is preferably adjusted such that metal elements (Ni+Co+Al or Mn):Li is in the range of 1.0:1.025 to 1.0:1.15 in terms of the molar ratio.

The firing step is a method for obtaining high Ni-containing composite oxide particles by firing, for example, the above raw material mixture under an oxygen atmosphere. Particles in a non-aggregated state or particles in an aggregated state also can be prepared by adjusting the firing temperature for the raw material mixture. For example, in the case where high Ni-containing composite oxide particles are obtained as particles in a non-aggregated state, the firing for the raw material mixture is preferably in the range of 750° C. to 1100° C. The firing temperature time in this case is preferably 20 hours to 150 hours. Alternatively, for example, in the case where high Ni-containing composite oxide particles are obtained as particles in an aggregated state, the firing temperature for the raw material mixture is preferably in the range of 600° C. to 1100° C. The firing time in this case is preferably 10 hours to 150 hours.

Examples of conductive agents included in the positive electrode active material layer include carbon powders such as carbon black, acetylene black, Ketjen black, and graphite. One of these may be used singly, or two or more of these may be used in combination.

Examples of the binder included in the positive electrode active material layer include fluorine-based polymers and rubber-based polymers. Examples of the fluorine-based polymer include polytetrafluoroethylene (PTFE), polyvinylidene fluoride (PVDF), and modifications thereof, and examples of the rubber-based polymer include ethylene-propylene-isoprene copolymers and ethylene-propylene-butadiene copolymers. One of these may be used singly, or two or more of these may be used in combination.

The positive electrode 11 of the present embodiment can be obtained by, for example, applying a positive electrode mixture slurry including a positive electrode active material, a conductive agent, a binder, and the like on a positive electrode current collector and drying the applied slurry to form a positive electrode active material layer, and rolling the positive electrode mixture layer. In general, particles in an aggregated state have a high hardness, and thus damage such as cracks may occur in the positive electrode current collector during rolling of the positive electrode active material layer. In order to prevent such damage in the positive electrode current collector, it is preferable to use a positive electrode current collector having a tensile strength in the range of 200 N/mm$^2$ to 300 N/mm$^2$. The tensile strength of the positive electrode current collector is a value obtained by measuring a piece prepared by cutting the positive electrode current collector into a size of 160 mm×25 mm as a measurement sample, using a "compact table-top tester EZ-L" manufactured by SHIMADZU CORPORATION, under conditions of tensile speed of 2 mm/min and a temperature of 20° C.

[Negative Electrode]

The negative electrode 12 comprises, for example, a negative electrode current collector and a negative electrode active material layer formed on the negative electrode current collector. As the negative electrode current collector, it is possible to use foil of a metal stable in the potential range of the negative electrode, such as copper, a film including such a metal disposed on the surface layer thereof, or the like. The negative electrode active material layer includes, for example, a negative electrode active material, a binder, a thickener, and the like.

The negative electrode active material is not particularly limited as long as being a material capable of occluding and releasing lithium ions. Examples of the material include metal lithium, lithium alloys such as lithium-aluminum alloys, lithium-lead alloys, lithium-silicon alloys, and lithium-tin alloys, carbon materials such as graphite, graphite fluoride, cokes, and organic fired products, and metal oxides such as $SnO_2$, $SnO$, and $TiO_2$. One of these may be used singly, or two or more of these may be used in combination.

As the binder, for example, a fluorine-based polymer, a rubber-based polymer, or the like can be used as in the case of the positive electrode, and a styrene-butadiene copolymer (SBR) or a modification thereof may be used.

Examples of the thickener include carboxymethyl cellulose (CMC) and polyethylene oxide (PEO). One of these may be used singly, or two or more of these may be used in combination.

The negative electrode 12 of the present embodiment can be obtained by, for example, applying a negative electrode mixture slurry including a negative electrode active material, a binder, a thickener, and the like on a negative electrode current collector and drying the applied slurry to form a negative electrode active material layer, and rolling the negative electrode active material layer.

[Non-Aqueous Electrolyte]

The non-aqueous electrolyte includes a non-aqueous solvent and an electrolyte salt dissolved in the non-aqueous solvent. The non-aqueous electrolyte is not limited to a liquid electrolyte (non-aqueous electrolyte solution) and may be a solid electrolyte for which a gel-like polymer or the like is used.

The non-aqueous solvent preferably includes a fluorine-containing cyclic carbonate. With a non-aqueous solvent including a fluorine-containing cyclic carbonate, reduction in the charge and discharge cycle characteristics of a non-aqueous electrolyte secondary battery may be inhibited, in comparison with a non-aqueous solvent including no fluorine-containing cyclic carbonate. The fluorine-containing cyclic carbonate is not particularly limited as long as being a cyclic carbonate containing at least one fluorine. Examples thereof include monofluoroethylene carbonate (FEC), 1,2-difluoroethylene carbonate, 1,2,3-trifluoropropylene carbonate, 2,3-difluoro-2,3-butylene carbonate, and 1,1,1,4,4,4-hexafluoro-2,3-butylene carbonate. One of these may be used singly, or two or more of these may be combined. Of these, from the viewpoint of suppression of the amount of hydrofluoric acid to be generated at high temperatures and the like, monofluoroethylene carbonate (FEC) is preferable.

The content of the fluorine-containing cyclic carbonate is preferably, for example, 0.1% by volume or more and 50% by volume or less based on the total volume in the non-aqueous solvent. In the case where the content of the fluorine-containing cyclic carbonate in the non-aqueous solvent satisfies the above range, in comparison with the case where the above range is not satisfied, deterioration in the charge and discharge cycle characteristics may be inhibited.

The non-aqueous solvent may include, in addition to the fluorine-containing cyclic carbonate, for example, a non-fluorine-based solvent. Examples of the non-fluorine-based solvent include cyclic carbonates, chain carbonates, carboxylates, cyclic ethers, chain ethers, nitriles such as acetonitrile, amides such as dimethylformamide, and mixed solvents thereof.

Examples of the above cyclic carbonates include ethylene carbonate (EC), propylene carbonate (PC), and butylene carbonate. Examples of the above chain carbonates include dimethyl carbonate, ethylmethyl carbonate (EMC), diethyl carbonate, methylpropyl carbonate, ethylpropyl carbonate, and methylisopropyl carbonate. One of these may be used singly, or two or more of these may be combined.

Examples of the above carboxylates include methyl acetate, ethyl acetate, propyl acetate, methyl propionate (MP), ethyl propionate, and γ-butyrolactone. One of these may be used singly, or two or more of these may be combined.

Examples of the above cyclic ethers include 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, and crown ethers. One of these may be used singly, or two or more of these may be combined.

Examples of the above chain ethers include 1,2-dimethoxyethane, diethyl ether, dipropyl ether, diisopropyl ether, dibutyl ether, dihexyl ether, ethylvinyl ether, butylvinyl ether, methylphenyl ether, ethylphenyl ether, butylphenyl ether, pentylphenyl ether, methoxytoluene, benzylethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether. One of these may be used singly, or two or more of these may be combined.

The non-aqueous electrolyte preferably include, for example, a carboxylic anhydride, from the viewpoint of improving the battery capacity. As the carboxylic anhydride, for example, a cyclic carboxylic anhydride represented by the following formula (1) is preferable:

[Formula 1]

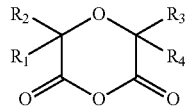

(1)

where $R_1$ to $R_4$ are each independently H, an alkyl group, an alkene group, or an aryl group.

Specific examples of the cyclic carboxylic anhydride include diglycolic anhydride, methyldiglycolic anhydride, dimethyldiglycolic anhydride, ethyldiglycolic anhydride, vinyldiglycolic anhydride, allyldiglycolic anhydride, and divinyldiglycolic anhydride. One of these may be used singly, or two or more of these may be combined.

The content of the carboxylic anhydride is preferably 0.1% by mass or more and 2.5% by mass or less based on the total mass of the non-aqueous electrolyte. The content of the carboxylic anhydride is also preferably 0.03 parts by mass or more and 3 parts by mass or less based on 100 parts by mass of the positive electrode active material. The content of the carboxylic anhydride is also preferably 0.05 parts by mass or more and 5 parts by mass or less based on 100 parts by mass of the negative electrode active material. In the case where at least any one of the contents described above is satisfied as the content of the carboxylic anhydride, the battery capacity may be further improved, in comparison with the case where none of the contents is satisfied.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ ($1<x<6$, n is 1 or 2), $LiB_{10}Cl_{10}$, LiCl, LiBr, LiI, chloroborane lithium, lithium lower aliphatic carboxylate, borates such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ (l and m are each an integer of 0 or more). One of these lithium salts may be used singly, or a plurality of these may be used in admixture. Of these, $LiPF_6$ is preferably used from the viewpoint of the ionic conductive property, electrochemical stability, and the like. The concentration of the lithium salt is preferably 0.8 to 1.8 mol per 1 L of the non-aqueous solvent.

[Separator]

As the separator 13, for example, a porous sheet having ion permeability and insulation is preferably used. Specific examples of the porous sheet include microporous thin films, woven fabric, and non-woven fabric. As materials for the separator, olefin resins such as polyethylene and polypropylene, cellulose, and the like are suitable. The separator may be a laminate having a cellulosic fiber layer and a layer of a thermoplastic resin fiber such as an olefinic resin. The separator may be a multi-layer separator including a polyethylene layer and a polypropylene layer, or a separator including a material such as an aramid-based resin, ceramic, or the like applied on the surface thereof may be used.

EXAMPLES

Hereinbelow, the present disclosure will be further described with reference to examples, but the present disclosure is not intended to be limited to the following examples.

[Production of High Ni-containing Composite Oxide Particles A]

$[Ni_{0.8}Co_{0.15}Al_{0.05}](OH)_2$ obtained by a coprecipitation method and LiOH were mixed in an Ishikawa-type grinding mortar such that the molar ratio among Lim and the total amount of Ni, Co, and Al was 1.1:1.0. Thereafter, this mixture was fired in an oxygen atmosphere at 730° C. for 50 hours to obtain high Ni-containing composite oxide particles A.

The high Ni-containing composite oxide particles A were embedded into a resin, and a cross section of the particles was prepared by cross section polisher (CP) processing. This cross section was observed with a SEM. As a result, the high Ni-containing composite oxide particles A were particles in an aggregated state where several hundreds or more of primary particles were assembled. The average particle size of the primary particles constituting the high Ni-containing composite oxide particles A was 326 nm.

[Production of High Ni-Containing Composite Oxide Particles B]

$[Ni_{0.8}Co_{0.15}Al_{0.05}](OH)_2$ obtained by a coprecipitation method and LiOH were mixed in an Ishikawa-type grinding mortar such that the molar ratio between Li and the total amount of Ni, Co, and Al was 1.1:1.0. Thereafter, this mixture was fired in an oxygen atmosphere at 800° C. for 50 hours to obtain high Ni-containing composite oxide particles B.

The high Ni-containing composite oxide particles B were embedded into a resin, and a cross section of the particles was prepared by cross section polisher (CP) processing. This cross section was observed with a SEM. As a result, the high Ni-containing composite oxide particles B, which were present in a state where the primary particles were separated completely one by one or in a state where 2 to 10 of the primary particles were assembled, were particles in a non-aggregated state.

The compression strength of the high Ni-containing composite oxide particles B was 600 MPa. The measurement method is as mentioned above.

[Production of High Ni-Containing Composite Oxide Particles C]

$[Ni_{0.85}Co_{0.10}Mn_{0.05}](OH)_2$ obtained by a coprecipitation method and $Li_2CO_3$ were mixed in an Ishikawa-type grinding mortar such that the molar ratio between Li and the total amount of Ni, Co, and Mn was 1.1:1.0. Thereafter, this mixture was fired in an air atmosphere at 750° C. for 30 hours to obtain high Ni-containing composite oxide particles C.

The high Ni-containing composite oxide particles C were embedded into a resin, and a cross section of the particles was prepared by cross section polisher (CP) processing. This cross section was observed with a SEM. As a result, the high Ni-containing composite oxide particles C were particles in an aggregated state, in which several hundreds or more of primary particles were assembled. The average particle size of the primary particles constituting the high Ni-containing composite oxide particles C was 187 nm.

[Production of High Ni-Containing Composite Oxide Particles D]

$[Ni_{0.85}Co_{0.10}Mn_{0.05}](OH)_2$ obtained by a coprecipitation method and $Li_2CO_3$ were mixed in an Ishikawa-type grinding mortar such that the molar ratio between Li and the total amount of Ni, Co, and Mn was 1.1:1.0. Thereafter, this mixture was fired in an air atmosphere at 900° C. for 30 hours to obtain high Ni-containing composite oxide particles D.

The high Ni-containing composite oxide particles D were embedded into a resin, and a cross section of the particles was prepared by cross section polisher (CP) processing. This cross section was observed with a SEM. As a result, the high Ni-containing composite oxide particles D, which were present in a state where the primary particles were separated completely one by one or in a state where 2 to 10 of the primary particles were assembled, were particles in a non-aggregated state.

The compression strength of the high Ni-containing composite oxide particles obtained was 256 MPa.

Example 1

[Production of Positive Electrode]

The high Ni-containing composite oxide particles A and the high Ni-containing composite oxide particles B were mixed such that the mass ratio thereof was 5:95, and this mixture was used as a positive electrode active material. After the positive electrode active material, acetylene black as a conductive agent, and polyvinylidene fluoride as a binder were mixed such that the mass ratio thereof were 100:1:1, N-methyl-2-pyrrolidone was added thereto to prepare a positive electrode mixture slurry. Subsequently, this positive electrode mixture slurry was coated onto both the surfaces of a positive electrode current collector composed of aluminum foil, the coated slurry was dried, and the collector was rolled using a rolling roller to produce a positive electrode in which a positive electrode active material layer was formed on both the surfaces of the positive electrode current collector.

[Preparation of Non-Aqueous Electrolyte]

To a mixed solvent prepared by mixing monofluoroethylene carbonate (FEC), dimethyl carbonate (DMC), and ethylmethyl carbonate (EMC) at a volume ratio of 15:45:40, $LiPF_6$ was dissolved at a concentration of 1.3 mol/L, and additionally, diglycolic anhydride (DGA) was dissolved thereto at 0.2% by mass to prepare a non-aqueous electrolyte.

[Production of Non-Aqueous Electrolyte Secondary Battery]

The positive electrode described above and metal lithium foil as a negative electrode were fitted with a terminal tabs and wound via a separator to produce an electrode assembly. The electrode assembly, together with the non-aqueous electrolyte described above, was encapsulated in an exterior member formed of resin-laminated aluminum foil so as to allow the terminal tabs to project from the exterior member. This was used as a non-aqueous electrolyte secondary battery of Example 1.

Example 2

A non-aqueous electrolyte secondary battery was produced in the same manner as in Example 1 except that the high Ni-containing composite oxide particles A and the high Ni-containing composite oxide particles B were mixed such that the mass ratio thereof was 10:90 and this mixture was used as the positive electrode active material.

Example 3

A non-aqueous electrolyte secondary battery was produced in the same manner as in Example 1 except that the high Ni-containing composite oxide particles A and the high Ni-containing composite oxide particles B were mixed such that the mass ratio thereof was 20:80 and this mixture was used as the positive electrode active material.

Example 4

A non-aqueous electrolyte secondary battery was produced in the same manner as in Example 1 except that the high Ni-containing composite oxide particles A and the high Ni-containing composite oxide particles B were mixed such that the mass ratio thereof was 30:70 and this mixture was used as the positive electrode active material.

Example 5

A non-aqueous electrolyte secondary battery was produced in the same manner as in Example 1 except that the high Ni-containing composite oxide particles A and the high Ni-containing composite oxide particles B were mixed such that the mass ratio thereof was 50:50 and this mixture was used as the positive electrode active material.

Comparative Example 1

A non-aqueous electrolyte secondary battery was produced in the same manner as in Example 1 except that only the high Ni-containing composite oxide particles B were used as the positive electrode active material.

Comparative Example 2

A non-aqueous electrolyte secondary battery was produced in the same manner as in Example 1 except that only the high Ni-containing composite oxide particles A were used as the positive electrode active material.

Comparative Example 3

A non-aqueous electrolyte secondary battery was produced in the same manner as in Example 1 except that the high Ni-containing composite oxide particles A and the high Ni-containing composite oxide particles B were mixed such that the mass ratio thereof was 60:40 and this mixture was used as the positive electrode active material.

[Measurement of Battery Capacity]

At an environment temperature of 25° C., each non-aqueous electrolyte secondary battery of Examples 1 to 5 and Comparative Examples 1 to 3 was subjected constant-current charging at a constant current of 0.1 It until the voltage reached 4.3 V and then subjected to constant-current discharging at a constant current of 0.1 It to achieve 0.02 It. It until the voltage reached 2.5 V. The discharge capacity at this time was taken as the battery capacity.

[Measurement of Direct Current Resistance (DCR) of Battery]

At an environment temperature of 25° C., each non-aqueous electrolyte secondary battery of Examples 1 to 5 and Comparative Examples 1 to 3 was charged at a constant current of 0.1 It to SOC of 10%. The voltage at this time was taken as $V_0$. Then, discharging was conducted at a constant current of 0.5 It for 10 seconds. The voltage at this time was taken as $V_1$. Then, the direct current resistance (DCR) was determined by the following equation.

$DCR = (V_0 - V_1)/0.5 \text{ It}$

The results of the battery capacity and direct current resistance in non-aqueous electrolyte secondary batteries of Examples 1 to 3 and Comparative Examples 1 to 3 are shown in Table 1.

TABLE 1

| | Positive electrode active material | | Battery characteristics | |
|---|---|---|---|---|
| | Constituent elements | Mass ratio (aggregated: non-aggregated) | Battery capacity (mAh/g) | Direct current resistance (Ω) |
| Example 1 | Li, Ni, Co, Al | 5:95 | 194.6 | 10.995 |
| Example 2 | Li, Ni, Co, Al | 10:90 | 195.7 | 10.795 |
| Example 3 | Li, Ni, Co, Al | 20:80 | 201.1 | 7.775 |
| Example 4 | Li, Ni, Co, Al | 30:70 | 208.0 | 9.45 |
| Example 5 | Li, Ni, Co, Al | 50:50 | 207.8 | 9.87 |
| Comparative Example 1 | Li, Ni, Co, Al | 0:100 | 192.2 | 11.745 |
| Comparative Example 2 | Li, Ni, Co, Al | 100:0 | 215.8 | 12.176 |
| Comparative Example 3 | Li, Ni, Co, Al | 60:40 | 206.8 | 11.25 |

Examples 1 to 5 are positive electrode active materials that have composite oxide particles including Ni, Co, Al, and Li and having a proportion of Ni of 80 mol % or more based on the total number of moles of the metal elements except for Li. The composite oxide particles are composed of particles in an aggregated state and particles in a non-aggregated state, and the content ratio between the particles in an aggregated state and the particles in a non-aggregated state is in the range of 5:95 to 50:50 in terms of mass ratio. In contrast, Comparative Example 1 is a positive electrode active material that has composite oxide particles including Ni, Co, Al, and Li and having a proportion of Ni of 80 mol % or more based on the total number of moles of the metal elements except for Li, and the composite oxide particles are composed only of particles in a non-aggregated state. When these Examples 1 to 5 were compared with Comparative Example 1, Examples 1 to 5 exhibited a higher battery capacity than that of Comparative Example 1, and also exhibited lower direct current resistance.

Comparative Examples 2 and 3 are positive electrode active materials that have composite oxide particles including Ni, Co, Al, and Li and having a proportion of Ni of 80 mol % or more based on the total number of moles of the metal elements except for Li. The composite oxide particles of Comparative Example 2 are composed only of particles in an aggregated state. The composite oxide particles of Comparative Example 3 are composed of particles in an aggregated state and particles in a non-aggregated state, and the content ratio between the particles in an aggregated state and the particles in a non-aggregated state is in the range of 60:40 in terms of mass ratio. These Comparative Examples 2 and 3 exhibited a higher battery capacity than that of Comparative Example 1, but the direct current resistance values were at a comparable level.

Example 6

A non-aqueous electrolyte secondary battery was produced in the same manner as in Example 1 except that the high Ni-containing composite oxide particles C and the high Ni-containing composite oxide particles D were mixed such that the mass ratio thereof was 5:95 and this mixture was used as the positive electrode active material.

Example 7

A non-aqueous electrolyte secondary battery was produced in the same manner as in Example 1 except that the high Ni-containing composite oxide particles C and the high Ni-containing composite oxide particles D were mixed such that the mass ratio thereof was 10:90 and this mixture was used as the positive electrode active material.

Example 8

A non-aqueous electrolyte secondary battery was produced in the same manner as in Example 1 except that the high Ni-containing composite oxide particles C and the high Ni-containing composite oxide particles D were mixed such that the mass ratio thereof was 20:80 and this mixture was used as the positive electrode active material.

Example 9

A non-aqueous electrolyte secondary battery was produced in the same manner as in Example 1 except that the high Ni-containing composite oxide particles C and the high Ni-containing composite oxide particles D were mixed such that the mass ratio thereof was 30:70 and this mixture was used as the positive electrode active material.

Example 10

A non-aqueous electrolyte secondary battery was produced in the same manner as in Example 1 except that the high Ni-containing composite oxide particles C and the high Ni-containing composite oxide particles D were mixed such that the mass ratio thereof was 50:50 and this mixture was used as the positive electrode active material.

Comparative Example 4

A non-aqueous electrolyte secondary battery was produced in the same manner as in Example 1 except that only the high Ni-containing composite oxide particles D were used as the positive electrode active material.

Comparative Example 5

A non-aqueous electrolyte secondary battery was produced in the same manner as in Example 1 except that only the high Ni-containing composite oxide particles C were used as the positive electrode active material.

Comparative Example 6

A non-aqueous electrolyte secondary battery was produced in the same manner as in Example 1 except that the high Ni-containing composite oxide particles C and the high Ni-containing composite oxide particles D were mixed such that the mass ratio thereof was 60:40 and this mixture was used as the positive electrode active material.

The battery capacity and direct current resistance of the non-aqueous electrolyte secondary batteries of Examples 6 to 10 and Comparative Examples 3 to 6 were measured. The results are shown in Table 2.

TABLE 2

| | Positive electrode active material | | Battery characteristics | |
|---|---|---|---|---|
| | Constituent elements | Mass ratio (aggregated: non-aggregated) | Battery capacity (mAh/g) | Direct current resistance (Ω) |
| Example 6 | Li, Ni, Co, Mn | 5:95 | 198.1 | 14.955 |
| Example 7 | Li, Ni, Co, Mn | 10:90 | 205.5 | 13.65 |
| Example 8 | Li, Ni, Co, Mn | 20:80 | 206.0 | 13.795 |
| Example 9 | Li, Ni, Co, Mn | 30:70 | 207.1 | 13.205 |
| Example 10 | Li, Ni, Co, Mn | 50:50 | 210.4 | 13.005 |
| Comparative Example 4 | Li, Ni, Co, Mn | 0:100 | 194.0 | 17.45 |
| Comparative Example 5 | Li, Ni, Co, Mn | 100:0 | 222.3 | 17.3 |
| Comparative Example 6 | Li, Ni, Co, Mn | 60:40 | 211.4 | 15.355 |

Examples 6 to 10 are positive electrode active materials that have composite oxide particles including Ni, Co, Mn, and Li and having a proportion of Ni of 80 mol % or more based on the total number of moles of the metal elements except for Li. The composite oxide particles were composed of particles in an aggregated state and particles in a non-aggregated state, and the content ratio between the particles in an aggregated state and the particles in a non-aggregated state is in the range of 5:95 to 50:50 in terms of mass ratio. In contrast, Comparative Example 4 is a positive electrode active material that has composite oxide particles including Ni, Co, Mn, and Li and having a proportion of Ni of 80 mol % or more based on the total number of moles of the metal elements except for Li, the composite oxide particles being composed only of particles in a non-aggregated state. When these Examples 6 to 10 were compared with Comparative Example 4, Examples 6 to 10 exhibited a higher battery capacity than that of Comparative Example 4, and also exhibited lower direct current resistance.

Comparative Examples 5 and 6 are positive electrode active materials that have composite oxide particles including Ni, Co, Mn, and Li and having a proportion of Ni of 80 mol % or more based on the total number of moles of the metal elements except for Li. The composite oxide particles of Comparative Example 5 are composed only of particles in an aggregated state. The composite oxide particles of Comparative Example 6 are composed of particles in an aggregated state and particles in a non-aggregated state, and the content ratio between the particles in an aggregated state and the particles in a non-aggregated state is in the range of 60:40 in terms of mass ratio. These Comparative Examples 5 and 6 exhibited a higher battery capacity than that of Comparative Example 1, but the direct current resistance was at a comparable level.

REFERENCE SIGNS LIST 10 non-aqueous electrolyte secondary battery
11 positive electrode
12 negative electrode
13 separator
14 electrode assembly
15 battery case
16 case body
17 sealing assembly
18, 19 insulating plate
20 positive electrode lead
21 negative electrode lead
22 projecting portion
23 filter
24 lower vent member
25 insulating member
26 upper vent member
27 cap
28 gasket

The invention claimed is:

1. A positive electrode active material for a non-aqueous electrolyte secondary battery having composite oxide particles, the composite oxide particles including Ni, Co, and Li, also including at least one of the group consisting of Mn and Al, and having a proportion of Ni of 80 mol % or more based on the total number of moles of the metal elements except for Li, wherein
   the composite oxide particles are composed of particles in an aggregated state and particles in a non-aggregated state,
   wherein the particles in a non-aggregated state include not only particles in a state where composite oxide particles are separated completely one primary particle by one primary particle but also particles in a state where 2 to 19 primary particles are assembled,
   the particles in an aggregated state refer to particles in a state where 20 or more primary particles of the composite oxide particles are assembled, and
   the particles in a non-aggregated state have an average particle size of in the range of 2 μm to 20 μm, and the particles in an aggregated state have an average particle size of in the range of 5 μm to 20 μm; and
   a content ratio between the particles in an aggregated state and the particles in a non-aggregated state is in the range of 5:95 to 50:50 in terms of mass ratio.

2. The positive electrode active material for a non-aqueous electrolyte secondary battery according to claim 1, wherein
   the particles in a non-aggregated state have a compression strength of 250 MPa or more.

3. The positive electrode active material for a non-aqueous electrolyte secondary battery according to claim 1, wherein
   the particles in an aggregated state are an aggregate of primary particles, wherein the primary particles have an average particle size of 500 nm or less.

4. The positive electrode active material for a non-aqueous electrolyte secondary battery according to claim 1, wherein
   the content ratio between the particles in an aggregated state and the particles in a non-aggregated state is in the range of 10:90 to 30:70 in terms of mass ratio.

5. A non-aqueous electrolyte secondary battery comprising:
   a positive electrode;
   a negative electrode; and
   a non-aqueous electrolyte, wherein
   the positive electrode has a positive electrode current collector and a positive electrode active material layer, and
   the positive electrode active material layer includes the positive electrode active material for a non-aqueous electrolyte secondary battery according to claim 1.

6. The non-aqueous electrolyte secondary battery according to claim 5, wherein
   the positive electrode current collector has a tensile strength of 200 N/mm² to 300 N/mm².

7. The non-aqueous electrolyte secondary battery according to claim 5, wherein
    the non-aqueous electrolyte has a non-aqueous solvent including a fluorine-containing cyclic carbonate, and
    a content of the fluorine-containing cyclic carbonate is 0.1% by volume to 50% by volume based on the total volume of the non-aqueous solvent.

8. The non-aqueous electrolyte secondary battery according to claim 5, wherein
    the non-aqueous electrolyte includes a carboxylic anhydride.

\* \* \* \* \*